United States Patent [19]

Ross et al.

[11] Patent Number: 5,096,992
[45] Date of Patent: Mar. 17, 1992

[54] USE OF MODIFIED DIISOCYANATES FOR PREPARING LINEAR THERMOPLASTIC POLYURETHANE ELASTOMERS HAVING IMPROVED PROPERTIES

[75] Inventors: Bert A. Ross, Conyngham, Pa.; John R. Damewood, Spartanburg, S.C.

[73] Assignee: Reeves Brothers, Inc., Spartanburg, S.C.

[21] Appl. No.: 695,370

[22] Filed: May 3, 1991

Related U.S. Application Data

[63] Continuation-in-part of Ser. No. 326,183, Mar. 20, 1989, Pat. No. 5,013,811.

[51] Int. Cl.$^5$ .................................................. C08G 18/10
[52] U.S. Cl. ........................ 528/59; 427/385.5; 427/389.9; 428/423.1; 528/60; 528/61; 528/65
[58] Field of Search ................ 427/385.5, 389.9; 428/423.1; 528/59, 60, 61, 65

[56] References Cited

U.S. PATENT DOCUMENTS

| | | | |
|---|---|---|---|
| Re. 31,671 | 9/1984 | Bonk et al. ............................. 528/65 |
| 3,401,133 | 9/1968 | Grace et al. ........................... 528/61 |
| 3,508,987 | 4/1970 | Burkley et al. ........................ 156/99 |
| 3,539,424 | 11/1970 | Tasklick .................................. 156/238 |
| 3,655,627 | 4/1972 | Hutzler et al. ........................ 528/64 |
| 3,684,639 | 8/1972 | Keberle et al. ....................... 156/331 |
| 3,758,443 | 9/1973 | Konig et al. .................... 260/75 NP |
| 3,764,457 | 10/1973 | Chang et al. ......................... 161/183 |
| 3,823,051 | 7/1974 | Chang .................................... 156/99 |
| 3,878,036 | 4/1975 | Chang .................................... 428/424 |
| 3,883,571 | 5/1975 | Allport et al. .............. 260/453 AM |
| 3,886,102 | 5/1975 | Olstowski ...................... 260/18 TN |
| 3,904,796 | 9/1975 | Zorn et al. ............................ 427/390 |
| 3,935,132 | 1/1976 | Gerkin et al. .................. 260/2.5 BE |
| 4,031,026 | 6/1977 | Ibbotson ................................ 252/182 |
| 4,072,634 | 2/1978 | Borchert et al. .............. 260/2.5 A |
| 4,088,616 | 5/1978 | Ichimura et al. .............. 260/2.5 AY |
| 4,115,429 | 9/1978 | Reiff et al. .................... 260/453 SP |
| 4,116,741 | 9/1978 | Thoma et al. ...................... 428/423.3 |
| 4,118,411 | 10/1978 | Reiff et al. .................... 260/453 SP |
| 4,160,686 | 7/1979 | Niederdellmann et al. ........ 156/331 |
| 4,229,347 | 10/1980 | Holt et al. ........................ 260/239 A |
| 4,234,714 | 11/1980 | Earing et al. ......................... 528/67 |
| 4,239,857 | 12/1980 | Harper .................................... 521/121 |
| 4,261,852 | 4/1981 | Carroll et al. ....................... 528/59 |
| 4,306,052 | 12/1981 | Bork et al. ............................ 528/67 |
| 4,307,004 | 12/1981 | Schuhmacher et al. .... 260/29.2 TN |
| 4,321,333 | 3/1982 | Alberino et al. ................... 521/121 |
| 4,334,034 | 6/1982 | Lehner et al. ....................... 525/28 |
| 4,384,050 | 5/1983 | Guthrie ................................ 521/137 |
| 4,384,051 | 5/1983 | Guthrie ................................ 521/137 |
| 4,423,200 | 12/1983 | Ganster et al. ....................... 528/67 |
| 4,435,527 | 3/1984 | Cuscurida et al. .................. 521/173 |
| 4,448,938 | 5/1984 | Bruynickx et al. ................ 525/457 |
| 4,463,141 | 7/1984 | Robinson ............................. 525/467 |
| 4,476,293 | 9/1984 | Robinson ............................. 528/76 |
| 4,478,960 | 10/1984 | Buethe et al. ....................... 521/160 |
| 4,490,300 | 12/1984 | Allen et al. .................... 260/453 SP |
| 4,490,301 | 12/1984 | Pantone et al. .............. 260/453 SP |
| 4,490,302 | 12/1984 | Ma et al. ........................ 260/453 SP |
| 4,533,729 | 8/1985 | Newland et al. .................... 528/371 |
| 4,539,156 | 9/1985 | Dewhurst et al. ........... 260/453 SP |
| 4,539,157 | 9/1985 | Dewhurst et al. ........... 260/453 SP |
| 4,539,158 | 9/1985 | Dewhurst et al. ........... 260/453 SP |
| 4,581,388 | 4/1986 | Rasshofer et al. .................. 521/159 |
| 4,581,470 | 4/1986 | Hoy et al. ............................ 560/189 |
| 4,587,322 | 5/1986 | Rasshofer et al. .................... 528/60 |
| 4,621,105 | 11/1986 | Statton et al. ....................... 521/107 |
| 4,634,743 | 1/1987 | Prier ..................................... 525/462 |
| 4,636,531 | 12/1988 | Schmidt ................................. 528/60 |
| 4,647,596 | 3/1987 | Ishii et al. ............................ 521/159 |
| 4,659,772 | 4/1987 | Hoy et al. ............................ 524/755 |
| 4,663,417 | 5/1987 | Hunter et al. ....................... 528/80 |
| 4,677,136 | 6/1987 | Rasshofer et al. .................. 521/159 |
| 4,683,171 | 7/1987 | Kuga et al. .......................... 428/354 |
| 4,705,721 | 11/1987 | Frisch et al. ........................ 428/349 |
| 4,727,094 | 2/1988 | Hoy et al. ............................ 521/164 |
| 4,743,650 | 5/1988 | Boutni ................................... 525/92 |
| 4,791,187 | 12/1988 | Suling et al. .......................... 528/60 |
| 4,868,268 | 9/1988 | Muller et al. ......................... 528/76 |
| 5,001,208 | 3/1991 | Ross et al. ............................ 528/61 |

FOREIGN PATENT DOCUMENTS

| | | |
|---|---|---|
| 61-76275 | 4/1986 | Japan . |
| 61-151235 | 7/1986 | Japan . |
| 1382186 | 7/1975 | United Kingdom . |
| 1476268 | 6/1977 | United Kingdom . |

OTHER PUBLICATIONS

Starner et al., "New Prepolymer Chemistry Enhance Cast PU," *Rubber and Plastics News*, Oct. 19, 1987, pp. 28-30.

*Primary Examiner*—Maurice J. Welsh
*Attorney, Agent, or Firm*—Pennie & Edmonds

[57] ABSTRACT

Linear polyurethane elastomers of a polyol component, at least two extender components, and a diisocyanate compound are prepared by reacting the diisocyanate compound with one of the extender components to form a modified diisocyanate component having a functionality of about 2 prior to reacting this modified component with the other components of the elastomer. These new elastomers can be processed at lower temperatures compared to elastomers prepared from similar compositions wherein the isocyanate compound is not modified.

30 Claims, No Drawings

USE OF MODIFIED DIISOCYANATES FOR PREPARING LINEAR THERMOPLASTIC POLYURETHANE ELASTOMERS HAVING IMPROVED PROPERTIES

CROSS REFERENCE TO RELATED APPLICATIONS

This application is a continuation-in-part of application Ser. No. 07/326,183, filed Mar. 20, 1989, now U.S. Pat. No. 5,013,811.

TECHNICAL FIELD

The present invention relates to the preparation of linear thermoplastic polyurethane elastomers of a polyol component, at least one extender component, and a diisocyanate compound by initially reacting the diisocyanate compound with the extender to form a modified diisocyanate component prior to reacting this component with the polyol component and other extenders, if any.

BACKGROUND ART

In today's market, polyurethane elastomers are utilized in a wide array of products and applications, including producing industrial coated fabrics. For the latter, these polyurethanes are generally linear polymers exhibiting elastomeric characteristics of high tensile strength and elongation.

These linear polyurethanes are quite varied in their final properties as a result of the large number of permutations that can be applied to the three main components that are used in their manufacture. These components are polyols, polyisocyanates, and one or more extenders (generally diols). Some examples of these compounds are: polyether, polyester, polycaprolactone, polycarbonate, and polybutadiene polyols; toluene diisocyanate, 4,4'-diphenylmethane diisocyanate, cyclohexane diisocyanate, isophorone diisocyanate, naphthalene diisocyanate; xylene diisocyanate, hexane diisocyanate, and hydrogenated 4,4'-diphenylmethane diisocyanate; and 1,4-butanediol, 1,6-hexanediol, and 1,3-butanediol extenders.

Typically, polyurethane elastomers which are considered top of the line with respect to performance, include, for example, polytetramethylene glycol (polyether) polyurethanes and poly(butane adipates or hexane adipates) ester. polyurethanes. Of these polymers, the polyether polyurethanes exhibit good hydrolytic stability and low temperature properties but are generally poor for fuel resistance and oxidation resistance, while the polyester polyurethanes are tough with good abrasion resistance, oxidation resistance and fuel resistance, but not particularly resistant to hydrolysis. Still, at the present time the polyesters are generally considered to represent the best compromise of physical properties and chemical resistance of the various polyurethanes.

There are also a few polyurethanes based on polycarbonate polyols in the market. It is well known that these polycarbonate polyurethanes have very good hydrolytic stability and generally have good to very good resistance to other degradation forces; however, they are usually too hard, rigid and brittle for use in industrial coated fabrics.

Currently, high performance coated fabrics are based on polyester polyurethanes in order to meet the specifications currently in effect, but resistance to hydrolysis remains their weak point and represents a problem for these products. Thus, there is a desire for improved hydrolytic stability in a number of applications. A polyurethane having improved hydrolytic properties and sufficient elastomeric character to be useful in the manufacturing of industrial coated fabrics is also desirable and needed.

A wide variety of organic isocyanate and polyisocyanate compounds are available for use in the preparation of polyurethane elastomers. The particular isocyanate is selected to facilitate preparation of the polyurethane for the intended application. Generally, isocyanates which are liquid at room temperature are prepared for ease of handling.

Diphenyl methane diisocyanate ("MDI") is a solid diisocyanate which is available on a commercial scale and consists primarily of the 4,4' isomer with a small amount of the 2,4' isomer. These isomers are both solids at room temperature, having melting points of 42° and 36° C., respectively. Other isomers, such as the 2,2' isomer, are also solid at room temperature.

To convert solid MDI into a form which is more desirable for use in the preparation of polyurethanes, the prior art teaches that a liquid MDI composition can be prepared, for example, by partially reacting solid MDI with a glycol, diol or other polyol. Generally, about 10 to 35% of the isocyanate groups are reacted with the polyol. A number of U.S. patents illustrate this concept, including U.S. Pat. Nos. 3,883,571, 4,115,429, 4,118,411, 4,229,347, 4,490,300, 4,490,301, 4,539,156, 4,539,157 and 4,539,158. Such liquid diisocyanates are stated as being useful for forming polyurethanes for a wide variety of applications. None of these modified diisocyanate compositions have, however, been utilized to prepare linear thermoplastic polyurethane elastomers which have lower temperature processing characteristics compared to similar compositions prepared from solid MDI.

SUMMARY OF THE INVENTION

The invention relates to improvements in fabrics coated by a linear thermoplastic polyurethane elastomer composition prepared from a polyol component, a diisocyanate compound, and first and second extender components. The processing temperature of the polyurethane is lowered by initially reacting the diisocyanate compound with the first extender in a molar ratio of above 2:1 to form a modified diisocyanate component having a functionality of about 2 prior to reacting the modified diisocyanate component with the polyol and second extender components. Thus, a linear thermoplastic polyurethane elastomer composition is formed which has lower temperature processing characteristics compared to similar compositions wherein the diisocyanate compound is not modified.

The polyol component may be a polyether polyol, polycarbonate polyol, polycaprolactone polyol, polyester polyol, polybutadiene polyol or mixtures thereof, and the first extender component is generally a polyol or amine compound having a molecular weight of less than about 500. Preferably the first extender component comprises a diol. Also, the second extender component is included for optimum results.

Generally, between about 10 to 30% by weight of the diisocyanate compound is modified so that the modified diisocyanate component has an NCO content of between about 14 and 33%, and preferably between about 20 and 26%. The most advantageous diisocyanate compound is one that primarily comprises 4,4'-diphenyl methane diisocyanate, with the first extender component being a polyol or amine compound having a molecular weight between about 60 and 250, such as 1,4-butane diol, tripropylene glycol, dipropylene glycol, propylene glycol, ethylene glycol, 1,6-hexane diol, 1,3-butane diol, neopentyl glycol, ethylene diamine or mixtures thereof.

DETAILED DESCRIPTION OF THE INVENTION

One preferred embodiment of this invention relates to a polyurethane elastomer based on a mixture of polycarbonate and polyether polyols, a modified diisocyanate component formed by reacting a diisocyanate compound with a low molecular weight extender such as tripropylene glycol, and a second extender of 1,4-butanediol. The modified diisocyanate and the second extender enable the polymer to have low temperature processing properties compared to those wherein the diisocyanate is not modified. This polymer also has hydrolytic stability which is vastly superior to conventional polyester polyurethanes. This polymer also has elastomeric characteristics and other physical properties which render it suitable for use in coated fabric manufacturing processes and resultant products produced therefrom.

In this embodiment, the polyether polyol and polycarbonate polyol can be used in any relative amounts provided that each are present in the composition. It has been found convenient to use a polyether polyol: polyarbonate polyol ratio in the range of between 2:1 to 1:8.

Instead of tripropylene glycol and 1,4-butanediol, other low molecular weight extenders can be used. Generally, polyols having a molecular weight of between about 60 and 500 (and preferably less than 250) have been found to be advantageous, although amines such as ethylene diamine can also be used. Specific polyols include diols such as 1,3-butanediol, ethylene glycol, tripropylene glycol, dipropylene glycol, propylene glycol, and neopentyl glycol, triols such as trimethyol propane, as well as mixtures of these components, can be used.

Any diisocyanate compound is suitable with those based on 4,4'-diphenyl methane diisocyanate being preferred. Toulene diisocyanate, naphthalene diisocyanate, isophorone diisocyanate, xylene diisocyanate and cyclohexane diisocyanate can also be used, if desired, but these compounds are generally more expensive or slower reacting. Such diisocyanate compounds are converted to a modified diisocyanate component as previously described.

The relative amount of modified diisocyanate to polyol ranges from above 2:1 to 20:1, and preferably between about 2.5:1 and 8:1. The second extender compound is included in an amount to achieve a final NCO-:OH ratio of between about 0.95 to 1.05/1. The Examples illustrate preferred ratios of components for use in the preparation of linear polyurethanes in accordance with this invention.

Another preferred embodiment of the invention relates to the manufacture of any type of polyurethane elastomer prepared from the modified diisocyanate component to significantly lower the temperature requirements for processing the polyurethane on heat processing equipment, i.e., calenders, extruders, injection molding apparatus, etc. This modification includes reacting diisocyanate compound with a low molecular weight extender (i.e., polyol or amine compound, to form a modified diisocyanate component, prior to preparing the polyurethane with the other components.

The term "MDI" will be used throughout this application to designate diisocyanate compounds primarily based on 4,4'-diphenyl methane diisocyanate which are preferred for use in this invention. Also, the term "liquid MDI" will be used to designate an essentially difunctional modified MDI component prepared from the reaction of a low molecular weight polyol with an MDI compound to form a modified diisocyanate composition which is liquid at room temperature.

The low molecular weight extender used to modify the diisocyanate compound generally includes diols, triols or amines having a molecular weight below about 500, but any polyol which enables the diisocyanate compound to possess a functionality of about 2 and an NCO content of between about 14 and 33%, preferably between 20 and 26%, after modification, would be acceptable.

In this embodiment, essentially any polyol component can be used for reaction with the liquid MDI component, including polyether, polyester, polycaprolactone, polycarbonate or polybutadiane polyols or mixtures thereof. As noted above, a preferred polyol component is mixture of a polyether polyol and polycarbonate polyol.

It is also possible to add additional extenders to such compositions, these extenders also being a polyol or amine compound, preferably one of relatively low molecular weight (i.e., less than about 500). It is also possible to utilize unsaturated polyols as extenders, such as low molecular weight diols which include one or more double bonds. However, any conventional extender known to those skilled in the art can be used, depending upon the results desired.

Thus, the present invention demonstrates how various polycarbonate and polyether polyols, modified diisocyanate components and extenders may be blended over a wide range to allow the design of polyurethane polymers having different physical characteristics and properties. This makes it possible to custom design a polymer for a particular application.

There are several different types of modified MDIs presently on the market, but the types suitable for use in this invention are essentially difunctional. The preferred liquid MDI components are made by reacting an MDI compound with a small amount of a diol such as tripropylene glycol or a mixture of diols. The material resulting from this slight extension of the MDI compound is a liquid at room temperature while, as noted above, the original MDI compound is a solid at such temperatures. This makes the liquid MDI substantially easier to handle and process, while retaining generally equivalent performance to the unmodified MDI compound.

Representative modified liquid MDI components which are suitable and preferred for use in the present invention are disclosed in U.S. Pat. Nos. 3,883,571, 4,115,429, 4,118,411, 4,229,347, 4,490,300, 4,490,301, 4,539,156, 4,539,157, and 4,539,158: all these components are essentially difunctional and are obtained as the reaction product of MDI. With a diol or polyol having a molecular weight below about 500. To the extent necessary to understand this component of the inventive compositions, these patents are expressly incorporated herein by reference thereto. Those isocyanates having a functionality which is much greater than two are not particularly suitable for use in this invention, since they promote crosslinking rather than linearity in the resultant polyurethane polymer. The functionality of these compounds should be above 1.9 but below 2.2, with the preferred modified diisocyanate components being those having a functionally of approximately 2 so as to facilitate the preparation of linear polyurethanes.

In the production of polyurethanes, it is generally known to utilize one of two different manufacturing processes. In one method, known as the "one-shot" approach, all hydroxyl bearing components (i.e., polyols and extender diols) are combined as a mixture, to which is added an isocyanate component in essentially stoichiometric quantities to form the final product. The second method contemplates the formation of a prepolymer by reacting excess isocyanate with one or more high molecular weight hydroxyl bearing components, followed by the reaction of this prepolymer with the extender to form the final product.

As noted above, the use of the modified diisocyanate components of this invention enables a polyurethane having lower temperature processing characteristics to be achieved. The temperature difference can be as great as 30° to 40° F. below that of a corresponding formulation wherein the diisocyanate compound is not modified. However, greater temperature reductions are achieved when the polyurethane is manufactured in a specific manner.

For example, if the polyurethanes of the invention are made by the conventional "one shot" technique, a slight reduction on the order of about 3–4 degrees is obtained: this representing only about 10% of the maximum reduction which could be achieved. Similarly, if solid MDI is used to prepare an isocyanate prepolymer with the high molecular weight polyol prior to reacting this prepolymer with the mixed extenders, a temperature reduction of about 4–5 degrees (i.e., about 15% of the maximum) is achieved.

Substantial reductions in the temperature processability of the resulting polyurethane can be achieved by following one of the following methods of manufacture. In one version, the isocyanate is pre-reacted with one of the extenders to form a modified isocyanate component prior to reaction with a mixture of the high molecular weight polyol and other extenders. This enables a temperature reduction of about 20 to 25 degrees to be achieved (i.e., about 60% of the optimum). Finally, the optimum temperature reduction is achieved by sequentially reacting the modified isocyanate component first with the high molecular weight polyol followed by reaction with the second extender. As noted above, a temperature reduction of 30 to 40 degrees is: possible, with the formation of a clear polyurethane polymer.

Again, MDI, modified as disclosed herein, is the most advantageous diisocyanate for use in preparing the polyurethanes of this invention, although the other isocyanates mentioned above can instead be used, if desired. When light stability in a clear product is desired, an isophorone diisocyanate can be used to achieve better results than MDI. For a lower cost isocyanate component, toluene diisocyanate ("TDI") can be used, but it is less reactive than MDI. Thus, when TDI is used, amine extenders, rather than polyol or diol extenders, should be used. After the linear polyurethane elastomers are prepared, they are applied to a fabric substrate in any one of a number of coating application techniques. The elastomer can be applied to the fabric in one or more layers or coats utilizing a single or three-head coating machine. It is also possible to utilize a calendaring procedure where the individual components of each layer are initially prepared in sheet form and then are bonded together between rollers under heat and pressure. When calendaring this material, the fabric substrate is initially coated with one or a few layers of the polyurethane on one side prior to calendaring the remaining layers to the initially coated fabric. Thereafter, the material can be turned over, and the other side of the substrate coated with one or a few layers of polymer for that side, followed by the calendaring process to add the remaining layers to final dimension.

The coating thickness or weight can vary over a wide range of from 0.1 to 10 ounces per yard ("osy"), with lesser weights of about 0.1 to 1 osy utilized when flexible fabrics are desired, with the heavier coatings being utilized where higher strength and/or mechanical or chemical resistance is needed.

If a selective coating (i.e., one which only partially covers the fabric substrate) is desired, a screen type roller or rotary screen printing device can be used to selectively apply the coating only upon specific areas of the fabric.

The fabric substrate may include one or more layers or arrangements of fibers of various materials, weights, thicknesses and widths depending upon the type of coated fabric product which is desired. The various configurations of fabric are generally known in the art and need not be explained in detail here. Nylon or other synthetic or natural staple of non-staple fibers or yarns could be used in a mat, woven, knitted or braided configuration to form the fabric substrate. One skilled in the art can select the best materials, structures, denier, etc., of the fibers or yarns for the particular application of the coated fabric product by routine testing. One skilled in the art can select the best combination of ingredients for any particular formulation.

These linear polyurethane elastomers are preferably made using a two step solution polymerization technique. Predried toluene, dimethyl formamide and the isocyanate are charged to a 3000 ml reactor (in some cases a 15,000 ml reactor was used). A given weight of polyol(s), the amount needed to achieve the desired prepolymer NCO/OH value, is dissolved in additional dry toluene. The reactor is then prepurged with dry nitrogen and maintained under a positive low pressure of dry nitrogen for the full reaction time.

The isocyanate containing solution is preheated to 65°-75° C. (depending on anticipated exotherm), and the solution of polyols is slowly added by a continuous stream (over one-half hour) to the reactor. The temperature is allowed to rise to 80°-90° C. (depending on system) and is maintained at this temperature for an additional two hours.

The desired extender diol is preweighed and dissolved in dry dimethyl formamide. The reactor is cooled to 60°-65° C. and two 7-10 gram samples of the reaction mixture are removed and analyzed for NCO content. The diol is then charged to the reactor, and the temperature raised (partly by the exotherm of extension) to 85°-90° C. and maintained at this temperature for two hours. A sample of the polymer is dried and an IR spectrum was run. If free NCO is detected in the spectrum, the reaction is continued for another hour.

The reaction solution is then allowed to cool to room temperature overnight and stored in a container until it can be tested. All mixtures were designed to yield a solution of 30% by weight of polymer dissolved in a 60/40 mixture of toluene/DMF.

This solution cooking technique provides an easy way of making this polymer, but it is difficult to evaluate the physical properties of such solutions. Thus, the solution collected from an individual cook is spread coated onto release paper and dried at 300° F. to remove the solvent. This film can then be stripped from the paper and used to conduct various physical property tests.

A. Modulus, Tensile Strength, and Elongation

One gram of cadmium stearate was added to 200 grams of dried polymer and intimately mixed on a two roll rubber mill. A 0.040 inch slab of polymer was removed from the mill and was used to make tensile specimens. This was done by pressing the slab between two polished plates in a heated Wabash press for 15 minutes at sufficient temperature and pressure to yield a 0.010-0.014 inch film. Temperatures and pressures varied depending upon the particular formulation. The press was cooled to room temperature and the film was removed from between the plates. From this film, five samples were cut in the size of one inch by six inches. These were then tested on an Instron and averages of 100% modulus, 200% modulus, tensile strength, and elongation were calculated from the test results. The temperature for the milling and pressing operations were observed and found to be related to formulation changes.

B. Toluene Swell

Two pieces, one inch by two inches, of the pressed film were immersed in toluene for 24 hours. Measurements of volume by displacement of alcohol before and after toluene immersion were used to calculate volume swell.

C. Flow Temperature and Flow Rate

20 A three to five gram sample of polymer was finely chopped and used to determine the temperature at which the polymer would flow at a measurable rate and to determine the rate itself on a Kayness, Inc. extrusion plastometer Model D-0051. A measurable rate was defined as greater than 0.15 grams per 10 minutes. Thus at temperatures below the flow temperature, neither fusion of the polymer nor flow greater than 0.15 grams is achieved. The flow rate is defined as the number of grams extruded from the barrel of the plastometer in a period of ten minutes.

D. Brookfield Viscosity

Fifteen grams of polymer were dissolved in 85 grams of dry dimethyl formamide and warmed to 30 degrees Centigrade in a constant temperature bath overnight in a closed waterproof container. The viscosity was then measured on a Brookfield viscometer as quickly as possible after removing from the bath. Viscosity data is reported in cps.

E. Glass Transition Temperature (Tg)

Several polymer slabs, including a known control, were measured for $T_g$. This work was done by two techniques, mechanical spectroscopy which measures the change in physical properties due to passing through the glass transition temperature and DSC (differential scanning calorimetry) which measures the second order transition defined as glass transition temperature.

The improvements and advantages associated with the linear polyurethane polymers developed in this invention are illustrated below in the Examples.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

The specific preferred chemicals utilized in the examples are listed below as follows:

| POLYOLS | | | | |
|---|---|---|---|---|
| Supplier | Identity | Type | OH Number | Equiv Wt. |
| PPG Industries | Duracarb 120 | aliphatic carbonate | 131.0 | 428.2 |
| PPG Industries | Duracarb 122 | aliphatic carbonate | 95.0 | 590.0 |
| PPG Industries | Duracarb 124 | aliphatic carbonate | 58.0 | 967.2 |
| QC Chemicals | Polymeg 1000 | PTMEG ether | 111.9 | 501.3 |
| QC Chemicals | Polymeg 2000 | PTMEG ether | 55.7 | 1007.2 |
| Whitco Chemical | Form-rez 44-112 | ester | 113.3 | 495.1 |

| ISOCYANATES | | | | |
|---|---|---|---|---|
| Supplier | Identity | Type | % NCO | Equiv. Wt. |
| ICI | Rubinate 44 | MDI | 33.6 | 125.0 |
| ICI | Rubinate LF-179 | liquid MDI | 23.0 | 182.5 |
| Mobay Corp. | Mondur PF | liquid MDI | 22.9 | 183.4 |
| BASF | Lupranate MP-102 | liquid MDI | 23.0 | 182.5 |
| Dow Chemical | Isonate 181 | liquid MDI | 23.0 | 182.5 |

| EXTENDER DIOLS | | |
|---|---|---|
| Supplier | Identity | Equivalent Weight |
| BASF | 1,4-butanediol | 45 |
| Dow Chemical | tripropylene glycol | 96 |

EXAMPLES 1-12

Table I (AB) illustrates the effect that modified liquid MDI components have on flow temperature of various polyurethanes compared to those made from the corresponding unmodified MDI compound. The table lists six polyurethanes made with various polyols, including some mixtures of polyols. Each two examples represent a polyurethane made from liquid MDI and its analog made from the corresponding MDI unmodified, solid component. As shown in the table, the percent hard segment is equivalent in each comparison. Examples 1, 3, 5, 7, 9 and 11 are in accordance with the present invention, while Examples 2, 4, 6, 8, 10 and 12 are included for comparison. In all cases, the liquid MDI polymer has a lower flow temperature than its solid MDI analog. Flow temperature is that temperature at which a measurable flow is first observed when tested on an extrusion plastometer.

Since flow temperature is a measure of the temperature at which the polymer may be processed on calendering and extrusion equipment, the use of the liquid MDI components allows the making of polymers which process at lower temperatures, and therefore are easier to process and manufacture into articles such as calendered sheets for coated fabrics. The results demonstrate that all experimental polymers made with liquid MDI components exhibited lower milling temperatures than those of their solid MDI analogs.

Although Table I illustrates polyurethanes made with polyether, polyester, and polycarbonate polyols, it would be expected that this improvement would be present regardless of the specific type of polyol used.

EXAMPLES 13-16

The section on chemicals lists four commercially available liquid MDI components and describes how they are produced. Table II (AB) demonstrates that these four isocyanates are essentially equivalent in their ability to modify the flow temperatures and therefore the processing temperatures of polyurethanes made from them. Any one of these four preferred isocyanates may be employed in the development of low temperature processable polyurethanes. As noted above, a wide variety of difunctional isocyanates which are modified by reaction with low molecular weight polyols would also be suitable for use in this invention.

EXAMPLES 17-22

Table III (AB) compares polycarbonate polyurethanes made from liquid MDI components against those made with solid MDI components. Examples 17-19 are in accordance with the invention, while Examples 20-22 are comparative. It can be seen from the data that polyurethane polymers made using liquid MDI exhibit better physical properties, particularly tensile strength, compared to those made with solid MDI. Flow temperatures were not specifically measured on the liquid MDI polymers, but processing on the mill was found to be significantly better than for polymers made with the comparable unmodified, solid MDI compounds.

It should also be noted that the use of liquid MDI allows the production of polyurethane elastomers having a higher percent hard segment. This is advantageous because in general the urethane linkages are much more stable to various degradation forces (i.e. hydrolysis, oxidation, etc.) than are ether, ester or other bonds in the polyol backbone.

EXAMPLES 23-38

Polyurethane elastomers made from an aliphatic polycarbonate polyol, liquid MDI and 1,4-butanediol were prepared as shown in Table III, Examples 17-19. A mixture of polycarbonate polyols was used in Example 38 of table IV. Excellent physical properties, particularly tensile strength and elongation, were achieved in these formulations. Upon further analysis of the tensile curves, it was observed that these polymers were more plastic than elastomeric in character. Thus, these polymers could be described as hard and tough with a high yield value as illustrated by the 100% modulus values. However, evaluation of films of the polycarbonate based polyurethane polymers exhibited poor cold crack properties.

To improve low temperature properties without sacrificing the properties of the polycarbonate backbone, a copolyol was introduced into the system, as shown in Examples 23-37 of Tables IV (AB). A polytetramethylene glycol ("PTMG") polyol was found to have the compatibility with the specific polycarbonate polyols used, with the molecular weight of 1000 and 2000 each found to be suitable.

From Table IV (B), it is observed that physical properties, i.e. modulus, elongation, tensile strength, and toluene swell are affected by percent weight secondary and by percent hard segment. Thus, as the percent of secondary polyol (PTMG polyether) is increased, (or the polycarbonate is decreased), modulus decreases and the polymer becomes more elastomeric than plastic. Also as the percent hard segment decreases, the modulus decreases but toluene swell (a measure of solvent resistance) increases. From this information, one skilled in the art can select the optimum combinations for the desired final product.

Two different molecular weight polyethers were evaluated. The results tend to indicate that change in properties is mainly related to the percent (by weight) of secondary polyol rather than to the molecular weight of the PTMG polyol. It is also observed that there is some lowering of tensile strength at higher percent secondary polyol, but at a weight ratio of primary/secondary polyol of greater than or equal to one, this is not significant. Increased molecular weight of these polymers can also be used to counteract this effect.

EXAMPLES 39 and 40

The ability to custom design a polymer to meet various physical requirements is suggested by the results of Table V. It is also possible to improve low temperature properties. Table V (AB) compares two formulations which are similar with the exception of the introduction of 20% PTMG polyether polyol into the polymer (Example 40). Again the changes in physical properties can be observed.

The $T_g$ of the formulations of these examples was determined by mechanical spectrometry (M.S.) and differential scanning calorimetry (DSC) to be as follows:

| Polymer of Example | M.S. $T_g$ (°C.) | DSC $T_g$ (°C.) |
|---|---|---|
| 39 | 50.9-56.0 | 21 |
| 40 | 30.9 | 11 |

Thus the mixture of the PTMG polyether polyol with the polycarbonate polyol resulted in a significant lowering of the $T_g$ (in degrees Centigrade). Thus, this polyol mixture increases the cold cracking and low temperature impact properties of the resulting linear polyurethane polymer.

EXAMPLES 41-45

Table VI (AB) illustrates the reproducibility of the invention by listing several formulations which were made at different times on different days.

EXAMPLES 46-48

As described above, most of the elastomers of the Examples were made using a solution polymerization technique and then dried for testing and experimental use. This technique is not a suitable process for use in commercial manufacturing, and other methods of polymerization can be used. One is to mix together the polyol(s) and diol(s) and then feed this stream with a stream of isocyanate to an intensive mixer. The two streams when mixed are heated to initiate polymerization and extruded as a polymer (one-shot). Another approach is to first make prepolymers from the polyol(s) using an excess of isocyanate and then to extend this material with the diol(s) in the presence of heat.

Two experiments were conducted in an attempt to simulate and evaluate these two approaches. In both cases, the formula of Example 40 was used. The one-shot experiment was conducted by weighing the polyols and diol into a plastic container and mixing well under nitrogen. The appropriate amount of LF-179 was then added, mixed well, capped under nitrogen and placed in an oven at 90° C. overnight. The prepolymer approach was conducted by mixing the polyols thoroughly with an excess of isocyanate (per formula), followed by capping and heating for two hours at 85° C. After removing the sample from the oven, an appropriate amount of diol was added, quickly mixed, capped and returned to a 90° C. oven overnight.

Table VII (AB) gives a comparison of a solution cook to a one-shot and a prepolymer cook. In all cases, flow temperature is still lower than a comparable unmodified MDI polymer and physical properties are very similar. Working these polymers on a rubber mill indicates that the prepolymer approach may actually yield a lower temperature processing polymer than the one-shot approach. Also, the prepolymer approach provides a much clearer polymer which is a sign of better uniformity and compatibility. Therefore the prepolymer approach is preferred although the one-shot approach will indeed yield acceptable polymers and, it is seen that a new linear polyurethane elastomers useful for a wide variety of applications can be prepared.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

TABLE I(A)

| EXAMPLE | ISOCYANATE | PRIMARY POLYOL | SECONDARY POLYOL | EQUIV RATIO | WEIGHT RATIO | PREPOL NCO/OH | FINAL NCO/OH |
|---|---|---|---|---|---|---|---|
| 1 | LF-179 | DURACARB 120 | POLYMEG 2000 | 2.410 | 1.025 | 2.503 | 0.981 |
| 2 | MDI | DURACARB 120 | POLYMEG 2000 | 2.410 | 1.025 | 3.340 | 0.980 |
| 3 | LF-179 | DURACARB 120 | POLYMEG 2000 | 3.565 | 1.516 | 2.600 | 0.950 |
| 4 | MDI | DURACARB 120 | POLYMEG 2000 | 3.565 | 1.516 | 1.478 | 0.950 |
| 5 | LF-179 | POLYMEG 1000 | — | — | — | 2.377 | 0.950 |
| 6 | MDI | POLYMEG 1000 | — | — | — | 3.171 | 0.950 |
| 7 | LF-179 | DURACARB 122 | POLYMEG 2000 | 3.546 | 2.079 | 3.163 | 0.950 |
| 8 | MDI | DURACARB 122 | POLYMEG 2000 | 3.546 | 2.079 | 4.220 | 0.951 |
| 9 | LF-179 | DURACARB 124 | POLYMEG 2000 | 1.575 | 1.512 | 4.471 | 0.950 |
| 10 | MDI | DURACARB 124 | POLYMEG 2000 | 1.575 | 1.513 | 1.517 | 0.950 |
| 11 | LF-179 | FORM-REZ 44-112 | — | — | — | 1.970 | 0.980 |
| 12 | MDI | FORM-REZ 44-112 | — | — | — | 2.633 | 0.980 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE I(B)

| EXAMPLE | % WEIGHT PRIMARY | % WEIGHT SECONDARY | % HARD SEGMENT | 100% MODULUS | 200% MODULUS | TENSILE STRENGTH | PERCENT ELONGATION | TOLUENE SWELL | FLOW TEMP | FLOW RATE | BROOKFIELD VISCOSITY |
|---|---|---|---|---|---|---|---|---|---|---|---|
| 1 | 26.91 | 26.26 | 46.83 | 896 | 1354 | 4772 | 531 | 79.2 | 150 | 1.825 | 115 |
| 2 | 26.93 | 26.28 | 46.79 | 1696 | 1920 | 2550 | 412 | 69.6 | 195 | 9.400 | 57 |
| 3 | 30.19 | 19.92 | 49.89 | 1028 | 1746 | 5094 | 494 | 104.6 | 150 | 1.868 | 93 |
| 4 | 30.10 | 19.90 | 50.00 | 761 | 905 | 1324 | 496 | 79.0 | 160 | 7.686 | 27 |
| 5 | 50.00 | — | 50.00 | 626 | 787 | 1968 | 655 | 92.0 | 150 | 10.070 | 54 |
| 6 | 50.00 | — | 50.00 | * | * | 1300 | 77 | 60.0 | 186 | 5.924 | 27 |
| 7 | 33.80 | 16.30 | 49.90 | 1082 | 1697 | 3745 | 413 | 105.0 | 150 | 6.158 | 42 |
| 8 | 33.80 | 16.20 | 50.00 | 1878 | * | 1911 | 148 | 62.3 | 194 | 1.555 | 34 |
| 9 | 30.10 | 19.90 | 50.00 | 1198 | 1707 | 3732 | 439 | 100.0 | 160 | 4.284 | 56 |
| 10 | 30.10 | 19.90 | 50.00 | 1740 | * | 1731 | 112 | 80.4 | 210 | 5.662 | 28 |
| 11 | 55.00 | — | 45.00 | 555 | 810 | 6928 | 579 | 51.4 | 175 | 7.578 | 254 |
| 12 | 55.00 | — | 45.00 | 1553 | 1885 | .3604 | 554 | 43.2 | 179 | 18.060 | 53 |

*Property Not Measured

TABLE II(A)

| EXAMPLE | ISOCYANATE | PRIMARY POLYOL | SECONDARY POLYOL | EQUIV RATIO | WEIGHT RATIO | PREPOL NCO/OH | FINAL NCO/OH |
|---|---|---|---|---|---|---|---|
| 13 | LF-179 | DURACARB 120 | POLYMEG 2000 | 3.681 | 1.565 | 2.618 | 0.952 |
| 14 | ISO.181 | DURACARB 120 | POLYMEG 2000 | 3.558 | 1.512 | 2.606 | 0.951 |
| 15 | MP-102 | DURACARB 120 | POLYMEG 2000 | 3.558 | 1.512 | 2.606 | 0.951 |

TABLE II(A)-continued

| EXAMPLE | ISOCYA-NATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 16 | MON PF | DURACARB 120 | POLYMEG 2000 | 3.558 | 1.512 | 2.606 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE II(B)

| EX-AMPLE | % WEIGHT PRIMARY | % WEIGHT SECON-DARY | % HARD SEG-MENT | 100% MOD-ULUS | 200% MOD-ULUS | TENSILE STRENGTH | PERCENT ELON-GATION | TOL-UENE SWELL | FLOW TEMP | FLOW RATE | BROOK-FIELD VISCOSITY |
|---|---|---|---|---|---|---|---|---|---|---|---|
| 13 | 30.38 | 19.41 | 50.21 | 1239 | 2066 | 5649 | 478 | 112.5 | 150 | 1.739 | 82 |
| 14 | 30.10 | 19.90 | 50.00 | 1057 | 1598 | 3962 | 492 | 94.0 | 150 | 4.990 | 55 |
| 15 | 30.10 | 19.90 | 50.00 | 1093 | 1638 | 4239 | 504 | 85.0 | 150 | 1.815 | 121 |
| 16 | 30.10 | 19.90 | 50.00 | 1057 | 1776 | 5668 | 507 | 90.0 | 160 | 2.436 | 111 |

TABLE III(A)

| EXAMPLE | ISOCYA-NATE | POLYOL | PREPOL NCO/OH | FINAL NCO/OH |
|---|---|---|---|---|
| 17 | LF-179 | DURACARB 120 | 2.477 | 0.992 |
| 18 | LF-179 | DURACARB 120 | 2.477 | 0.992 |
| 19 | LF-179 | DURACARB 120 | 2.477 | 0.992 |
| 20 | MDI | DURACARB 120 | 2.475 | 0.990 |
| 21 | MDI | DURACARB 120 | 2.700 | 0.990 |
| 22 | MDI | DURACARB 120 | 2.901 | 0.990 |

Note: Each formulation contains 1,4-butane diol as an extender as necessary to achieve the final NCO/OH ratio.

TABLE III(B)

| EX-AMPLE | % WEIGHT PRIMARY | % HARD SEG-MENT | 100% MODULUS | 200% MODULUS | TENSILE STRENGTH | PERCENT ELON-GATION | TOL-UENE SWELL | FLOW TEMP | FLOW RATE | BROOK-FIELD VISCOSITY |
|---|---|---|---|---|---|---|---|---|---|---|
| 17 | 45.19 | 54.81 | 2605 | * | 6739 | 297 | 68.0 | ** | * | * |
| 18 | 45.19 | 54.81 | 2086 | * | 6100 | 351 | 53.0 | ** | * | * |
| 19 | 45.19 | 54.81 | 1924 | * | 5904 | 367 | 54.0 | ** | * | * |
| 20 | 53.19 | 46.81 | 1398 | * | 2528 | 304 | 78.0 | 160 | 12.620 | 36 |
| 21 | 50.76 | 49.24 | 2372 | 3515 | 4469 | 304 | 78.0 | 160 | 12.620 | 36 |
| 22 | 48.79 | 51.21 | 2927 | 3909 | 4763 | 288 | 48.5 | 175 | 17.390 | 40 |

*Property not measured
**Flow temperature not specifically measured but visually observed to be lower (on the order of about 150 F.) compared to that of Examples 20-22.

TABLE IV(A)

| EXAMPLE | ISOCYA-NATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 23 | LF-179 | DURACARB 120 | POLYMEG 1000 | 8.988 | 7.677 | 2.480 | 0.977 |
| 24 | LF-179 | DURACARB 120 | POLYMEG 2000 | 8.996 | 3.949 | 2.480 | 0.977 |
| 25 | LF-179 | DURACARB 120 | POLYMEG 1000 | 3.995 | 3.412 | 2.479 | 0.977 |
| 26 | LF-179 | DURACARB 120 | POLYMEG 1000 | 2.999 | 2.562 | 2.475 | 0.980 |
| 27 | LF-179 | DURACARB 120 | POLYMEG 1000 | 2.999 | 2.562 | 2.475 | 0.980 |
| 28 | LF-179 | DURACARB 120 | POLYMEG 1000 | 2.327 | 1.988 | 2.481 | 0.977 |
| 29 | LF-179 | DURACARB 120 | POLYMEG 1000 | 2.334 | 1.993 | 2.099 | 0.980 |
| 30 | LF-179 | DURACARB 120 | POLYMEG 1000 | 1.498 | 1.280 | 2.478 | 0.977 |
| 31 | LF-179 | DURACARB 120 | POLYMEG 2000 | 2.410 | 1.025 | 2.826 | 0.983 |
| 32 | LF-179 | DURACARB 120 | POLYMEG 1000 | 0.999 | 0.853 | 2.478 | 0.977 |
| 33 | LF-179 | DURACARB 120 | POLYMEG 2000 | 2.333 | 1.025 | 2.481 | 0.977 |
| 36 | LF-179 | DURACARB 120 | POLYMEG 2000 | 2.333 | 1.025 | 2.481 | 0.977 |
| 35 | LF-179 | DURACARB 120 | POLYMEG 2000 | 2.410 | 1.025 | 2.503 | 0.981 |
| 36 | LF-179 | DURACARB 120 | POLYMEG 2000 | 2.410 | 1.025 | 2.120 | 0.984 |
| 37 | LF-179 | DURACARB 120 | POLYMEG 2000 | 1.032 | 0.439 | 2.520 | 0.983 |
| 38 | LF-179 | DURACARB 120 | DURACARB 122 | 1.000 | 0.725 | 2.475 | 0.990 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE IV(B)

| EX-AMPLE | % WEIGHT PRIMARY | % WEIGHT SECONDARY | % HARD SEGMENT | PROPERTIES | | | | | | | |
|---|---|---|---|---|---|---|---|---|---|---|---|
| | | | | 100% MODULUS | 200% MODULUS | TENSILE STRENGTH | PERCENT ELONGATION | TOLUENE SWELL | FLOW TEMP | FLOW RATE | BROOKFIELD VISCOSITY |
| 23 | 40.25 | 5.24 | 54.51 | 2256 | 3262 | 6386 | 362 | 68.0 | 160 | 3.850 | 79 |
| 24 | 38.36 | 9.71 | 51.93 | 1799 | 3155 | 6644 | 355 | 106.0 | 150 | 1.039 | 104 |
| 25 | 35.51 | 10.41 | 54.08 | 1808 | 2917 | 6573 | 386 | 88.0 | 150 | 1.720 | 84 |
| 26 | 33.22 | 12.97 | 53.81 | 1947 | 3193 | 7284 | 371 | 76.0 | 150 | 0.821 | 227 |
| 27 | 33.22 | 12.97 | 53.81 | 1704 | 3055 | 7294 | 374 | 72.0 | 150 | 0.750 | 63 |
| 28 | 30.81 | 15.50 | 53.69 | 1068 | 2321 | 5846 | 388 | 91.0 | 150 | 5.232 | 63 |
| 29 | 33.88 | 17.00 | 49.12 | 625 | 1466 | 6452 | 439 | 123.0 | 150 | 2.495 | 141 |
| 30 | 26.24 | 20.50 | 53.26 | 732 | 1536 | 5542 | 450 | 79.0 | 150 | 5.272 | 51 |
| 31 | 25.26 | 24.65 | 50.09 | 1243 | 2088 | 6563 | 521 | 81.0 | 160 | 1.790 | 217 |
| 32 | 21.70 | 25.43 | 52.87 | 1071 | 1705 | 4388 | 463 | 77.0 | 150 | 7.580 | 70 |
| 33 | 26.91 | 26.26 | 46.83 | 844 | 1284 | 5803 | 579 | 100.0 | 150 | 0.980 | 153 |
| 34 | 26.91 | 26.26 | 46.83 | 867 | 1354 | 6041 | 558 | 96.0 | 150 | 0.905 | 188 |
| 35 | 26.91 | 26.26 | 46.83 | 896 | 1354 | 4772 | 531 | 79.2 | 150 | 1.825 | 115 |
| 36 | 29.19 | 28.49 | 42.32 | 489 | 712 | 5362 | 612 | 164.0 | 160 | 2.313 | 229 |
| 37 | 17.50 | 39.86 | 42.64 | 520 | 684 | 3170 | 683 | 148.0 | 150 | 2.792 | 99 |
| 38 | 20.8 | 28.7 | 50.4 | * | * | * | * | 105.0 | 150 | 1.608 | 134 |

*Property Not Measured

TABLE V(A)

| EXAMPLE | ISOCYANATE | PRIMARY POLYOL | FORMULATIONS | | | | |
|---|---|---|---|---|---|---|---|
| | | | SECONDARY POLYOL | EQUIV RATIO | WEIGHT RATIO | PREPOL NCO/OH | FINAL NCO/OH |
| 39 | LF-179 | DURACARB 120 | — | — | — | 2.477 | 0.992 |
| 40 | LF-179 | DURACARB 120 | POLYMEG 2000 | 3.565 | 1.516 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE V(B)

| EX-AMPLE | % WEIGHT PRIMARY | % WEIGHT SECONDARY | % HARD SEGMENT | PROPERTIES | | | | | | | |
|---|---|---|---|---|---|---|---|---|---|---|---|
| | | | | 100% MODULUS | 200% MODULUS | TENSILE STRENGTH | PERCENT ELONGATION | TOLUENE SWELL | FLOW TEMP | FLOW RATE | BROOKFIELD VISCOSITY |
| 39 | 45.19 | — | 54.81 | 2086 | * | 6100 | 351 | 53.0 | * | * | * |
| 40 | 30.19 | 19.92 | 49.89 | 1028 | 1746 | 5094 | 494 | 104.6 | 150 | 1.686 | * |

*Property not measured

TABLE VI(A)

| EXAMPLE | ISOCYANATE | PRIMARY POLYOL | FORMULATIONS | | | | |
|---|---|---|---|---|---|---|---|
| | | | SECONDARY POLYOL | EQUIV RATIO | WEIGHT RATIO | PREPOL NCO/OH | FINAL NCO/OH |
| 41 | LF-179 | DURACARB 120 | POLYMEG 2000 | 2.333 | 1.025 | 2.481 | 0.977 |
| 42 | LF-179 | DURACARB 120 | POLYMEG 2000 | 2.333 | 1.025 | 2.481 | 0.977 |
| 43 | LF-179 | DURACARB 120 | POLYMEG 2000 | 2.410 | 1.025 | 2.503 | 0.981 |
| 44 | LF-179 | DURACARB 120 | POLYMEG 2000 | 3.565 | 1.516 | 2.600 | 0.950 |
| 45 | LF-179 | DURACARB 120 | POLYMEG 2000 | 3.565 | 1.516 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE VI(B)

| EX-AMPLE | % WEIGHT PRIMARY | % WEIGHT SECONDARY | % HARD SEGMENT | PROPERTIES | | | | | | | |
|---|---|---|---|---|---|---|---|---|---|---|---|
| | | | | 100% MODULUS | 200% MODULUS | TENSILE STRENGTH | PERCENT ELONGATION | TOLUENE SWELL | FLOW TEMP | FLOW RATE | BROOKFIELD VISCOSITY |
| 41 | 26.91 | 26.26 | 46.83 | 867 | 1354 | 6041 | 558 | 96.0 | 150 | 0.905 | 188 |
| 42 | 26.91 | 26.26 | 46.83 | 844 | 1284 | 5803 | 579 | 100.0 | 150 | 0.980 | 153 |
| 43 | 26.91 | 26.26 | 46.83 | 896 | 1354 | 4772 | 531 | 79.2 | 150 | 1.825 | 115 |
| 44 | 30.19 | 19.92 | 49.89 | 1072 | 1824 | 5405 | 488 | 92.3 | 150 | 1.440 | 105 |
| 45 | 30.19 | 19.92 | 49.89 | 1028 | 1746 | 5094 | 494 | 104.6 | 150 | 1.868 | 93 |

TABLE VII(A)

| EXAMPLE | ISOCYANATE | PRIMARY POLYOL | FORMULATIONS SECONDARY POLYOL | EQUIV RATIO | WEIGHT RATIO | PREPOL NCO/OH | FINAL NCO/OH |
|---|---|---|---|---|---|---|---|
| 46 | LF-179 | DURACARB 120 | POLYMEG 2000 | 3.565 | 1.516 | 2.600 | 0.950 |
| 47 | LF-179 | DURACARB 120 | POLYMEG 2000 | 3.565 | 2.079 | 2.600 | 0.950 |
| 48 | LF-179 | DURACARB 120 | POLYMEG 2000 | 3.565 | 2.079 | 2.600 | 0.950 |

Notes:
1. Equivalent and weight ratio refer to the ratio of primary to secondary polyol by equivalents or weight, respectively.
2. Each formulation contains 1,4-butane diol as an extender in an amount necessary to achieve the final NCO/OH ratio.

TABLE VII(B)

| EXAMPLE | % WEIGHT PRIMARY | % WEIGHT SECONDARY | % HARD SEGMENT | 100% MODULUS | 200% MODULUS | TENSILE STRENGTH | % ELONGATION | TOLUENE SWELL | FLOW TEMP | FLOW RATE | BROOKFIELD VISCOSITY |
|---|---|---|---|---|---|---|---|---|---|---|---|
| 46 | 30.19 | 19.92 | 49.89 | 1028 | 1746 | 5094 | 494 | 104.6 | 150 | 1.868 | 93 |
| 47 | 30.20 | 19.90 | 49.90 | 915 | 1691 | 4885 | 442 | 115.0 | 160 | 2.207 | 202 |
| 48 | 30.20 | 19.90 | 49.90 | 1144 | 2342 | 6634 | 409 | 105.0 | 160 | 1.111 | 373 |

What is claimed is:

1. In the preparation of a fabric coated with a linear thermoplastic polyurethane elastomer composition that includes a polyol component, a diisocyanate compound, a first extender component having a molecular weight of less than about 500 and a second extender component, the improvement which comprises lowering the processing temperature of said polyurethane by reacting the diisocyanate compound with said first extender in a molar ratio of about 2:1 to form a modified diisocyanate component having a functionality of about 2 prior to reacting the modified diisocyanate component with the polyol and second extender components, thus forming a linear thermoplastic polyurethane elastomer composition having lower temperature processing characteristics compared to similar compositions wherein the diisocyanate compound is not modified to facilitate manufacture of the coated fabric.

2. The invention defined by claim 1 wherein the polyol component is a polyether polyol, polycarbonate polyol, polycaprolactone polyol, polyester polyol, polybutadiene polyol or mixtures thereof.

3. The invention defined by claim 1 wherein the first extender component is a polyol or amine compound.

4. The invention defined by claim 3 wherein the first extender component comprises a diol.

5. The invention defined by claim 1 wherein the second extender component is a polyol or amine compound having a molecular weight of less than about 500 and which is different from said first extender component.

6. The invention defined by claim 1 wherein between about 10 to 30% by weight of the diisocyanate compound is modified so that the modified diisocyanate component has an NCO content of between about 14 to 33%.

7. The invention defined by claim 6 wherein the NCO content of the modified diisocyanate component is between about 20 to 26%.

8. The invention defined by claim 1 wherein the diisocyanate compound primarily comprises 4,4'-diphenyl methane diisocyanate.

9. The invention defined by claim 1 wherein the first extender component is a polyol having a molecular weight between about 60 and 250.

10. The invention defined by claim 1 wherein the first extender component is 1,4-butane diol, tripropylene glycol, dipropylene glycol, propylene glycol, ethylene glycol, 1,6-hexane diol, 1,3-butane diol, neopentyl glycol, ethylene diamine or mixtures thereof.

11. The invention defined by claim 1 wherein the coating has a weight of between about 0.1 and 10 ounces per square yard.

12. A fabric coated with a linear thermoplastic polyurethane elastomer composition comprising a mixed polyol component including a polycarbonate polyol in an amount sufficient to impart hydrolytic stability to the composition and a polyether polyol in an amount sufficient to improve the low temperature impact properties to the composition; a diisocyanate compound; a first extender component; and a second extender component; wherein the diisocyanate compound is initially reacted with one of the extender components in a molar ratio of above 2:1 so as to form a modified diisocyanate component having a functionality of about 2 prior to reaction with the other components to provide relatively low temperature processing properties to the composition to facilitate manufacture of the coated fabric, wherein the polyol component provides superior hydrolytic stability and low temperature flexibility properties to the composition and the coated fabric.

13. The coated fabric of claim 12 wherein the first extender component is a polyol or amine compound having a molecular weight of less than about 500.

14. The coated fabric of claim 12 wherein the first extender component comprises a diol.

15. The coated fabric of claim 12 wherein the diisocyanate compound primarily comprises 4,4'-diphenyl methane diisocyanate.

16. The coated fabric of claim 12 wherein the first extender component is a polyol having a molecular weight between about 60 and 250.

17. The coated fabric of claim 12 wherein at least one of the extender components comprises 1,4-butane diol, tripropylene glycol, dipropylene glycol, propylene glycol, ethylene glycol, 1,6-hexane diol, 1,3-butane diol, neopentyl glycol, ethylene diamine or mixtures thereof.

18. The coated fabric of claim 12 wherein the polyether polyol and polycarbonate polyol are present in the polyol component in a relative amount of between 2:1 to 1:8.

19. The coated fabric of claim 12 wherein one extender component comprises 1,4-butane diol and the other extender component comprises tripropylene glycol.

20. The coated fabric of claim 12 wherein about 10 to 30% by weight of the diisocyanate compound is modified so that the modified diisocyanate component has an NCO content of between about 14 to 33%.

21. The coated fabric of claim 20 wherein the NCO content of the modified diisocyanate component is between about 20 and 26%.

22. The coated fabric of claim 12 wherein the coating has a weight of between about 0.1 and 10 ounces per square yard.

23. A method for preparing a fabric coated with a linear thermoplastic polyurethane elastomer composition which comprises:

initially reacting a diisocyanate compound with a first extender component having a molecular weight of less than about 500 in a molar ratio of about 2:1 so as to form a modified diisocyanate component having a functionality of about 2 and to provide relatively low temperature processing properties to the composition;

subsequently reacting the modified diisocyanate component with a polyol and second extender to form a linear thermoplastic polyurethane elastomer composition, wherein the polyol component provides superior hydrolytic stability and low temperature flexibility properties to the composition; and coating at least a portion of a fabric substrate with said polyurethane elastomer composition.

24. The method of claim 23 wherein the modified diisocyanate component is subsequently reacted with a mixture of the polyol and second extender components.

25. The method of claim 23 wherein the polyol component is reacted with the modified diisocyanate component prior to reaction with the second extender.

26. The method of claim 23 wherein the relative amount of modified diisocyanate to polyol ranges from above about 2:1 to 20:1 and the second extender is included in an amount to achieve a final NCO:OH ratio of between about 0.95/1 and 1.05/1.

27. The method of claim 23 which further comprises selecting a polyol component having an amount of a polycarbonate polyol to impart hydrolytic stability to the composition and an amount of a polyether polyol sufficient to improve the low temperature impact properties of the composition, the polyether polyol and polycarbonate polyol being present in the polyol component in a relative amount of 2:1 to 1:8.

28. The method of claim 23 wherein the diisocyanate compound is initially reacted with the first extender to provide a modified diisocyanate compound having an NCO content of between 14 to 33%.

29. The method of claim 23 wherein the diisocyanate compound comprises 4,4'-diphenyl methane diisocyanate, and each of the first and second extender components is a polyol or amine compound having a molecular weight of less than about 500.

30. The method of claim 23 which further comprises applying said composition to substantially completely cover said fabric substrate and at a coating weight of about 0.1 to 190 ounces per square yard.

* * * * *